(12) United States Patent
Passmore

(10) Patent No.: US 12,117,544 B1
(45) Date of Patent: Oct. 15, 2024

(54) PASSIVE MULTISPECTRAL SCANNER THAT USES RECURSIVE ADAPTIVE SAMPLING

(71) Applicant: VR Media Technology, Inc., Los Angeles, CA (US)

(72) Inventor: Charles Gregory Passmore, Austin, TX (US)

(73) Assignee: VR Media Technology, Inc., Los Angeles, CA (US)

( * ) Notice: Subject to any disclaimer, the term of this patent is extended or adjusted under 35 U.S.C. 154(b) by 0 days.

(21) Appl. No.: 18/664,909

(22) Filed: May 15, 2024

(51) Int. Cl.
*G01S 3/06* (2006.01)

(52) U.S. Cl.
CPC .................... *G01S 3/06* (2013.01)

(58) Field of Classification Search
CPC ........................................................ G01S 3/06
USPC ...... 342/179, 357.43, 357.52, 359, 373, 420
See application file for complete search history.

(56) References Cited

U.S. PATENT DOCUMENTS

| | | | |
|---|---|---|---|
| 8,502,733 B1* | 8/2013 | Negus ................... | H01Q 1/246 342/359 |
| 9,036,792 B2* | 5/2015 | Cacioppo .............. | H04W 4/029 379/88.17 |
| 2011/0199254 A1* | 8/2011 | Bishop .................. | G01S 13/867 342/179 |
| 2012/0249363 A1* | 10/2012 | Kolinko ............. | H01Q 21/0043 342/179 |

* cited by examiner

*Primary Examiner* — Bo Fan
(74) *Attorney, Agent, or Firm* — ARC IP Law, PC; Joseph J. Mayo

(57) ABSTRACT

A system that passively scans for electromagnetic radiation across a potentially wide area and wide spectrum to identify objects in the area based on their emission spectra. The system may use antennas that can be aimed to sweep across a large range of azimuth and elevation angles, and frequency selectors that measure signals in a large set of frequency bands. To make scanning this large space feasible, the system uses recursive adaptive scanning, which scans at progressively finer grid spacings only in areas where signal intensities in each frequency band are changing rapidly. Preliminary scans may be made to measure background noise levels in each frequency and direction, again using recursive adaptive scanning, and this noise may be subtracted during scans for objects of interest. Objects may be identified by finding spikes in any of the frequency bands and matching them to a database of known object signatures.

12 Claims, 6 Drawing Sheets

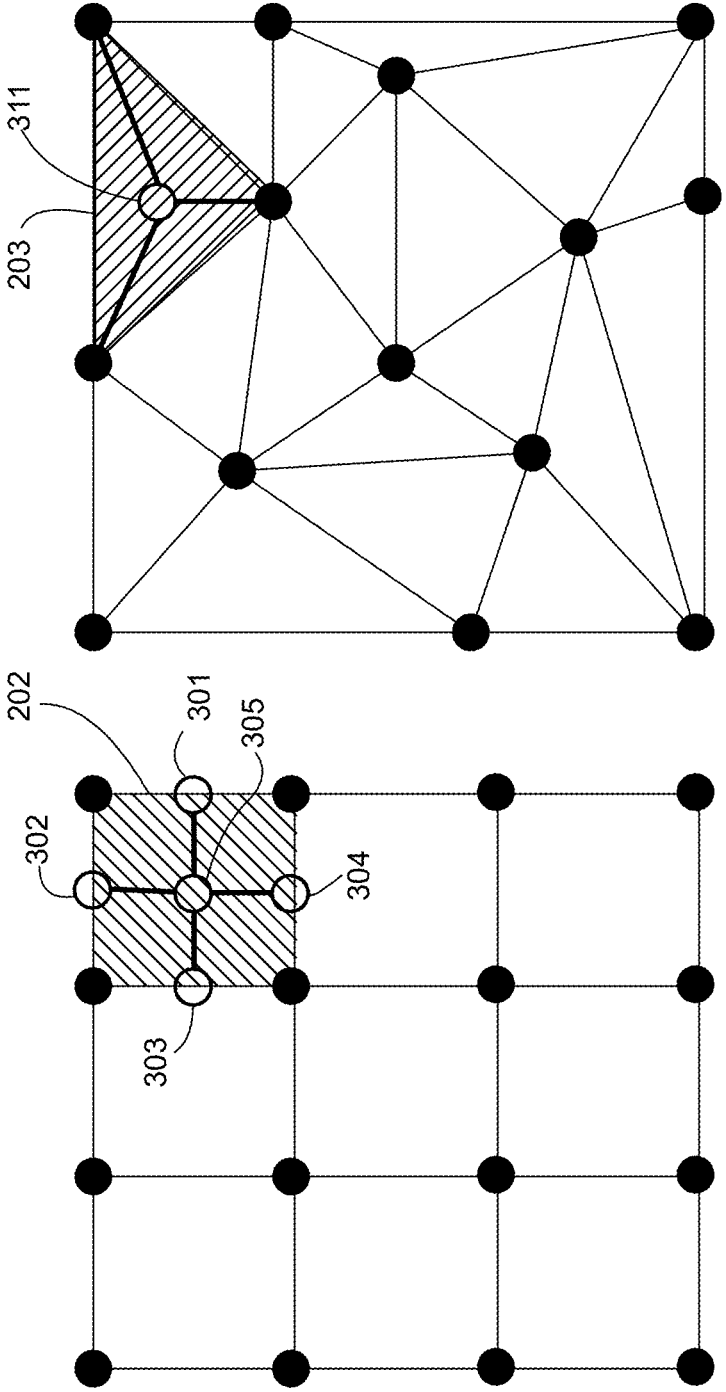
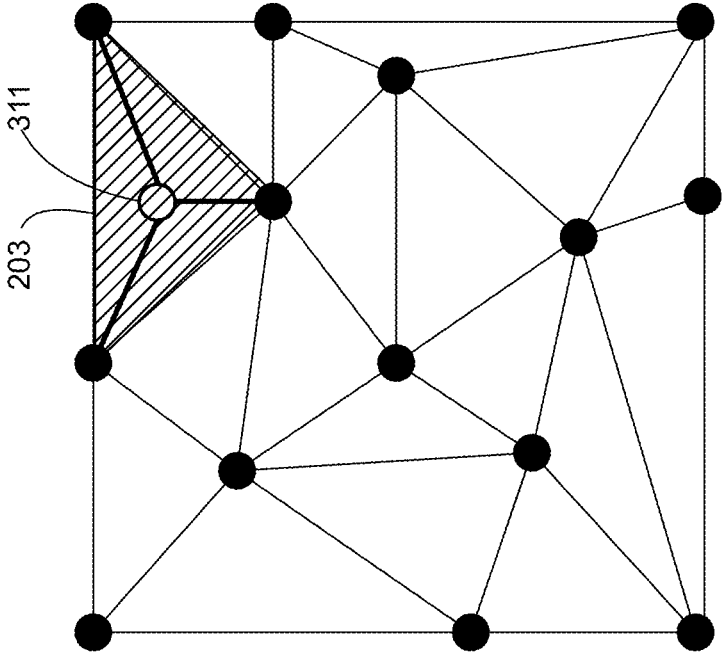
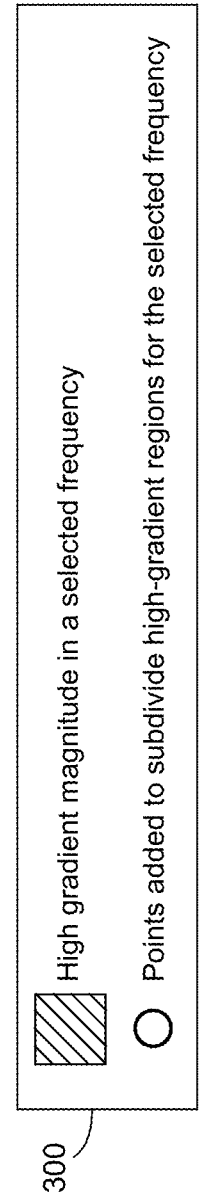
FIG. 3B
FIG. 3A

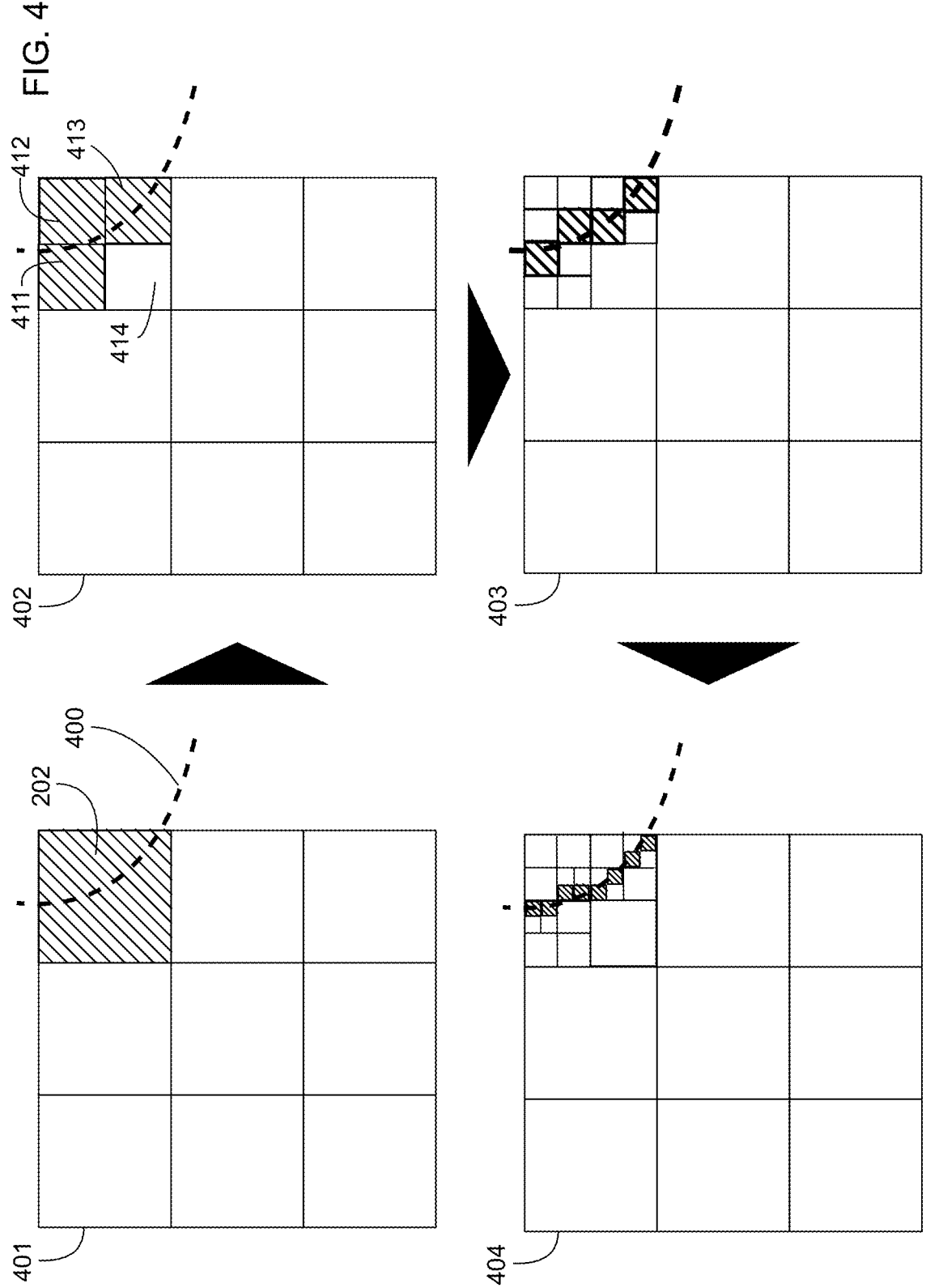

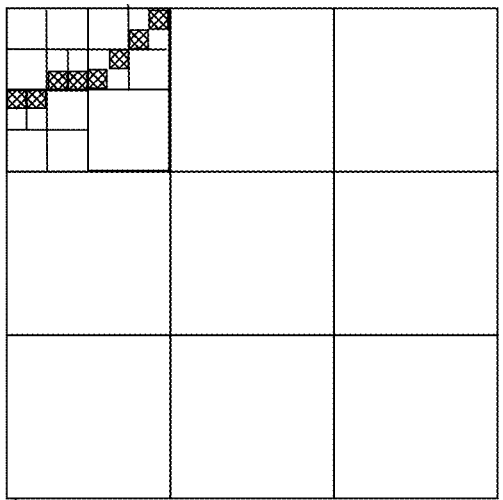
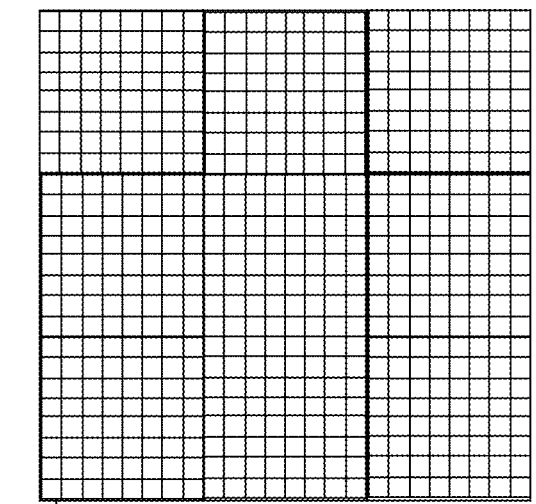
FIG. 5

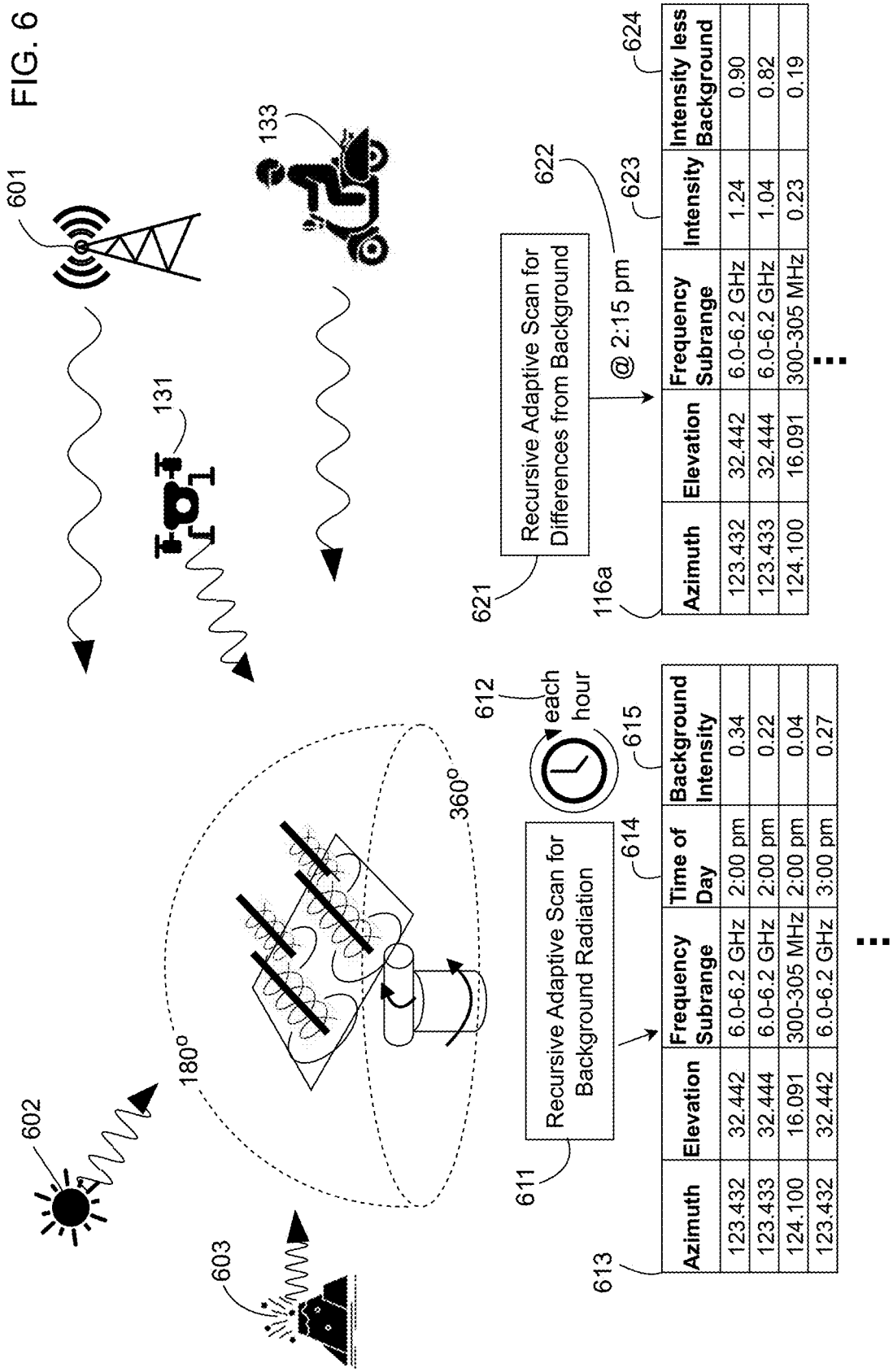

PASSIVE MULTISPECTRAL SCANNER THAT USES RECURSIVE ADAPTIVE SAMPLING

BACKGROUND OF THE INVENTION

Field of the Invention

One or more embodiments of the invention are related to the field of surveillance systems. More particularly, but not by way of limitation, one or more embodiments of the invention enable a passive multispectral scanner that uses recursive adaptive sampling.

Description of the Related Art

Surveillance with electromagnetic radiation is usually active, in that signals are transmitted into areas of interest and objects are detected via reflections. Radar is an illustrative technology that uses this approach. One problem with active transmission for surveillance is that the transmissions can be detected and localized, providing a target for opponents. Another limitation is that objects can be designed to elude detection through the use of specialized shapes and materials.

Most objects of interest emit some type of radiation, for example from motors or communications systems. A passive surveillance system can therefore attempt to detect objects by receiving and interpreting this emitted radiation. Passive systems have the benefit of being harder to detect. However, a challenge with passive systems is that the frequencies of radiation emitted by objects vary across a very wide spectrum. Scanning across this wide spectrum and across a wide area for signals is prohibitively time-consuming because of the massive amount of data that needs to be captured and analyzed. As a result, existing systems have typically either been active, or have listened for signals in specific frequency ranges.

For at least the limitations described above there is a need for a passive multispectral scanner that uses recursive adaptive sampling.

BRIEF SUMMARY OF THE INVENTION

One or more embodiments of the invention may enable a passive multispectral scanner that uses recursive adaptive sampling. The system may receive and analyze signals from a large number of directions and in a large number of frequency bands, using adaptive sampling to make the process feasible.

One or more embodiments of the invention may include one or more directional antennas, an aiming system coupled to these antennas, a frequency selection system coupled to these antennas, and a controller with a processor and a memory that is coupled to the aiming system and the frequency selection system. The antennas may be configured to receive electromagnetic signals within a total frequency range.

The aiming system may be configured to aim the antennas to receive signals from sources emitting at an azimuth angle and an elevation angle relative to a base orientation of the antennas, where the azimuth angle lies within an azimuth range, and the elevation angle lies within an elevation range.

The frequency selection system may be configured to obtain a signal strength in many frequency subranges, where each frequency subrange lies within the total frequency range.

The controller may be configured to create or update a signal strength data structure in memory that associates a signal strength with an azimuth, elevation, and frequency subrange. It may divide the azimuth range and the elevation range into a grid of points, where each point has an azimuth within the azimuth range and an elevation within the elevation range. The grid of points forms vertices of polygons that form a tessellation of the surface spanned by the azimuth range and the elevation range. For each point in the grid, the controller may transmit the azimuth and elevation of the point to the aiming system, obtain the signal strength corresponding to each frequency subrange from the frequency selection system, and update the signal strength data structure with an entry that includes the azimuth, the elevation, the frequency subrange, and the signal strength. For each polygon and for each frequency subrange, the controller may estimate the gradient magnitude of the signal strength in that frequency subrange within the polygon. When this gradient magnitude exceeds a threshold, the controller may subdivide the polygon into a subgrid that includes interior points within the polygon, where each interior point has an associated interior point azimuth and interior point elevation. The controller may then transmit the interior point azimuth and elevation to the aiming system, obtain the signal strength in the frequency subrange, and update the signal strength data structure with the interior point azimuth and elevation, the frequency subrange, and the signal strength. It may then continue dividing polygons of the subgrid until the gradient magnitude is smaller than a minimum, or until the resolution limit of the aiming system is reached.

In one or more embodiments, the azimuth range may be at least 180 degrees, and the elevation range may be at least 45 degrees. In one or more embodiments, the azimuth range may be 360 degrees and the elevation range may be 180 degrees.

In one or more embodiments, the total frequency range may be at least 50 kilohertz to 7 gigahertz. In one or more embodiments, the number of frequency subranges may be 5,000 or more. In one or more embodiments, the number of frequency subranges may be 10,000 or more.

In one or more embodiments, the resolution limit of the aiming system may be less than or equal to one arc-second in azimuth and elevation.

In one or more embodiments, the controller may also be configured to create or update a background noise signal strength data structure that associates a background noise signal strength with an azimuth, an elevation, and a frequency subrange. It may measure the background noise signal strength across the azimuth range, the elevation range, and the frequency subranges, and update the background noise signal strength data structure with the measured background noise signal strengths. For each point in the grid of points, after obtaining the signal strength for that point corresponding to each frequency subrange, it may subtract the background noise signal strength associated with the azimuth and elevation of the point and with each frequency subrange from the signal strength. For each polygon defined by the grid of points and for each frequency subrange, when the gradient magnitude within the polygon exceeds the threshold, the controller may subtract the background noise signal strength from the signal strength measured for each interior point and each frequency subrange.

In one or more embodiments, the background noise signal strength data structure may also associate background noise signal strength with a time of day. The controller may measure the background noise signal strength across the azimuth and elevation ranges, the frequency subranges, and at multiple times of day, and update the background noise signal strength data structure with the measured background noise signal strength. When measuring signal strength at grid points or interior points within subdivided polygons, the controller may subtract the background noise signal strength at the associated azimuth, elevation, frequency subrange, and time of day corresponding to the time of the measurement. In one or more embodiments, the multiple times of day for background noise measurement may be once per hour or more frequently.

In one or more embodiments, measurement of background noise signal strength may also use an initial grid that is subdivided based on gradient magnitude. For each point in the grid, the controller may transmit the azimuth and elevation of the point to the aiming system, obtain the background noise signal strength in each frequency subrange from the frequency selection system, and update the background noise signal strength data structure with an entry that includes the azimuth, elevation, frequency subrange, and background noise signal strength. For each polygon defined by the grid and each frequency subrange, the controller may estimate the gradient magnitude of the background noise signal strength within the polygon. When the gradient magnitude exceeds a threshold, the controller may subdivide the polygon into a subgrid with interior points, transmit each interior point magnitude to the aiming system, obtain the background noise signal strength at the frequency subrange from the frequency selector, and update the background noise signal strength data structure with the azimuth and elevation of the interior point, the frequency subrange, and the background noise signal strength. Subdividing may continue until the gradient magnitude is smaller than a minimum, or until the resolution limit of the aiming system is reached.

In one or more embodiments, the system may also include a database with frequency emission signatures for multiple objects. The controller may compare the signal strength data structure to the database to identify one or more objects that are present.

BRIEF DESCRIPTION OF THE DRAWINGS

The above and other aspects, features and advantages of the invention will be more apparent from the following more particular description thereof, presented in conjunction with the following drawings wherein:

FIG. 2A divides the zone into squares, and FIG. 2B divides the zone into irregular triangles.

FIGS. 3A and 3B show subsequent steps in a recursive adaptive scan for the initial sampling of FIGS. 2A and 2B, respectively. A region with a high intensity gradient magnitude in a particular frequency subrange may be subdivided into subregions, and the scan then recurses to sample the new vertices of the subregions.

FIG. 4 shows four steps of a recursive adaptive scan using the sample points of FIG. 2A as the initial step; each step subdivides high gradient regions into four subregions, which are then recursively scanned.

FIG. 5 illustrates the huge efficiency gain from recursive adaptive scanning compared to full raster scanning of an entire area; this gain makes it practical to scan a large area for objects of interest across many frequencies.

FIG. 6 shows an illustrative embodiment that performs a scan of an area at different times of day to record background noise, and then subtracts background noise from subsequent scans to identify new objects in the area.

DETAILED DESCRIPTION OF THE INVENTION

A passive multispectral scanner that uses recursive adaptive sampling will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention may enable passive scanning in a wide range of electromagnetic frequencies over a potentially large area of interest. Passive scanning only receives radiation; it does not transmit. A passive scanning system therefore does not broadcast any evidence of its existence or its position, which may be a significant advantage in military applications, for example.

Figure 1:
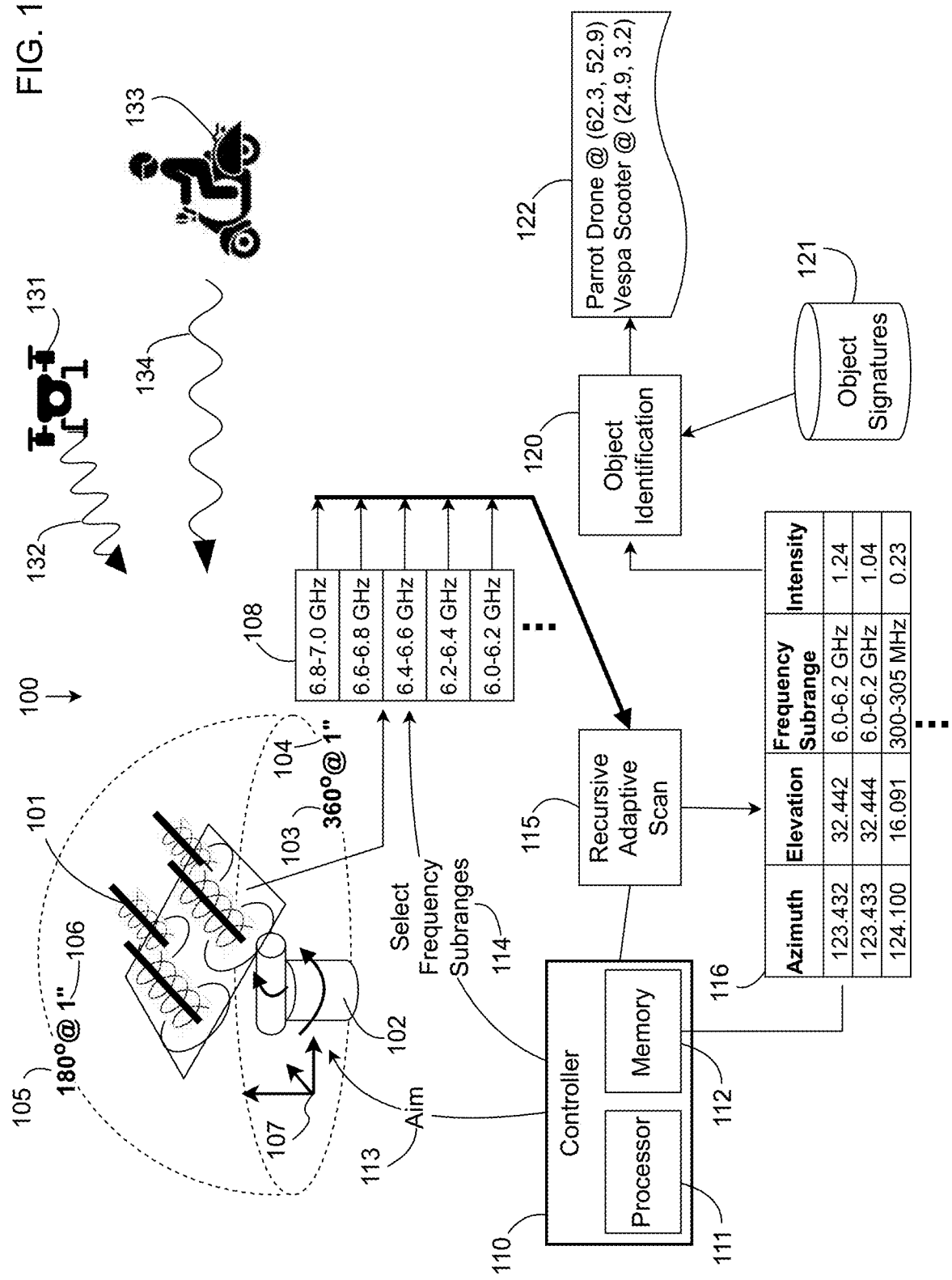
FIG. 1 is an architectural diagram of an illustrative embodiment of the invention, which includes antennas, an aiming system, a frequency selector, and a controller that performs a recursive adaptive scan to identify objects in the environment.

FIG. 1 shows an illustrative embodiment 100 of a passive scanning system. This embodiment has one or more directional antennas 101 that receive electromagnetic radiation across a range of frequencies. In one or more embodiments, antennas 101 may include one or more antenna arrays. Antenna or antennas 101 may be of any size and shape. The antennas may be coupled to an aiming system 102 that aims the antennas at a specific azimuth and elevation relative to a base orientation 107 of the antenna system. When the antennas are aimed in a direction, they will receive radiation from objects in the environment that emit radiation in or near that direction towards the antennas. In some situations, the antennas may also receive radiation reflected or refracted by objects in the environment, or they may detect the presence of objects by the shadow created by the objects from other radiation sources behind the objects. Aiming system 102 may be for example a mechanical pan-tilt mechanism, or it may be an antenna array that can be steered to receive radiation from a specific direction. One or more embodiments may use a combination of mechanical aiming and array steering to aim at a specific direction or range of directions.

Aiming mechanism 102 may have a range in both azimuth and elevation. Illustrative system 100 has a full 360-degree range 103 in azimuth and a full 180-degree range 105 in elevation, and it can therefore aim anywhere in the upper half sphere surrounding the antennas. (With a 360-degree range in azimuth, a tilt mechanism or equivalent aiming system may reach any aim in the upper half sphere with only a 90-degree range, so in this case a 180-degree elevation range is equivalent to a 90-degree elevation range.) Some embodiments may have more limited ranges, such as 180 degrees in azimuth and 45 degrees in elevation for example, which may be sufficient for detecting objects that are at ground level and on one side of the system. In some applications the aiming system may limit the range of a scan instead of using the full possible range, for example when a specific subregion of the environment is of interest.

Aiming system 102 may also have a minimum resolution 104 in azimuth and a minimum resolution 106 in elevation; illustrative system 100 has one arc-second resolution in both azimuth and elevation. The combination of large ranges and small resolutions enabled by one or more embodiments of the invention implies that full scanning of the entire range at the finest possible resolution may be very time consuming and may generate enormous amounts of data to be processed. For example, with 360 degrees of azimuth at one arc-second resolution and 90 degrees of elevation at one arc-second resolution, the aiming system can aim in any of $4.2 \times 10^{11}$ directions. Capturing and processing data in all of these directions may be prohibitive in many applications. Therefore, one or more embodiments of the invention may use recursive adaptive scanning, as described below, rather than full "raster scanning" in all directions, to reduce the amount of data to a manageable level.

In addition to its potential ability to scan a wide area in many different directions, system 100 may also be able to scan across a wide range of frequencies, and to capture multispectral data that indicates intensity in a large number of different frequency bands. This capability allows the system to detect a large number of different types of objects that may emit radiation in many different frequencies, and to differentiate more effectively between objects by matching the spectra of their emissions in many different bands. The antennas 101 may for example be coupled to a frequency selection system 108, which may be able to capture the signal intensity (and potentially other characteristics such as phase and polarization) in any of a set of frequency subranges. This frequency selection system 108 may include for example a set of amplifiers that are tuned to or can be tuned to specific frequency bands. It may also hardware or software to filter signals into frequency bands, using Fourier transforms or similar transforms for example. Scanning for signal intensity in different frequency bands may be performed serially or in parallel or using a combination of serial and parallel scanning. The entire frequency range collected by the frequency selection system may be potentially very wide; one or more embodiments may for example scan frequencies from 50 KHz or less to 7 GHz or more. The number of different frequency subranges that are selectable by the frequency selection system 108 may also be very large; for example, one or more embodiments may be able to collect signal data in 5,000 or more subranges, and some may collect in 10,000 or more subranges. The large number of frequency subranges combined with the wide range and small resolution of aiming makes full brute-force raster scanning even more prohibitive; for example, with 360-degree azimuth and 90-degree elevation at one arc-second resolution, and 10,000 frequency subranges, a single naïve raster scan would collect, store, and process $4.2 \times 10^{15}$ signal intensities at different aim directions and frequencies. If, for example, each signal intensity required a byte of storage, a single full scan would generate over 4,000 terabytes of data.

The aiming system 102 and the frequency selection system 108 may be connected to a controller system 110, which may include one or more processors 111 and one or more memories 112. The controller or its components may be co-located with the antenna system, or remote from it and connected by network connections. Processor or processors 111 may be for example, without limitation, a CPU, a GPU, an ASIC, an embedded system, a desktop computer, a laptop computer, a server computer, or a network of any number of these processors. Memory or memories 112 may be for example, without limitation, RAM, ROM, hard drives, database systems, or any combination of these components. Controller 110 may transmit aiming instructions with a target azimuth and elevation 113 to aiming system 102, and may transmit frequency subrange selections 114 to frequency selection system 108, and it may receive and process signal information received from the aim direction 113 in the selected frequency subranges 114.

As described above, a full raster scan across all frequency subranges may be prohibitive in many applications. Therefore, in one or more embodiments of the invention, controller 110 may perform a recursive adaptive scan 115, illustrated below, to sample the space of aim directions and frequencies intelligently and efficiently in order to determine what objects may be present in the environment. This scan transmits specific aim directions 113 and frequency subranges 114 to the aiming system 102 and frequency selection system 108, respectively, and receives signal intensities from the frequency selection system. The received data may be stored in a data structure (or in multiple data structures) in memory 112 for subsequent analysis. An illustrative data structure 116 may have entries with an azimuth, an elevation, a frequency subrange, and an signal strength intensity. In one or more embodiments additional signal information such as phase and polarity may also be stored in data structure 116. Data structure 116 may be constructed by scan 115 in multiple steps, as described below, where the results of a coarser sampling may be used to determine where to refine the sampling in a subsequent step.

Controller 110 may then perform an object identification step 120, which may compare the data 116 to a database 121 of signatures of known types of objects. These signatures 121 may for example indicate in which frequency bands specific types of objects emit large amounts of radiation. These signatures may be compared to spikes in frequency intensity in data structure 116 to determine which type or types of objects may be present, and in which directions. In the example of FIG. 1, the result of object identification 120 may include report 122 that identifies objects 131 and 133 and their directions relative to the base orientation 107 of scanning system 100.

Figure 2A:
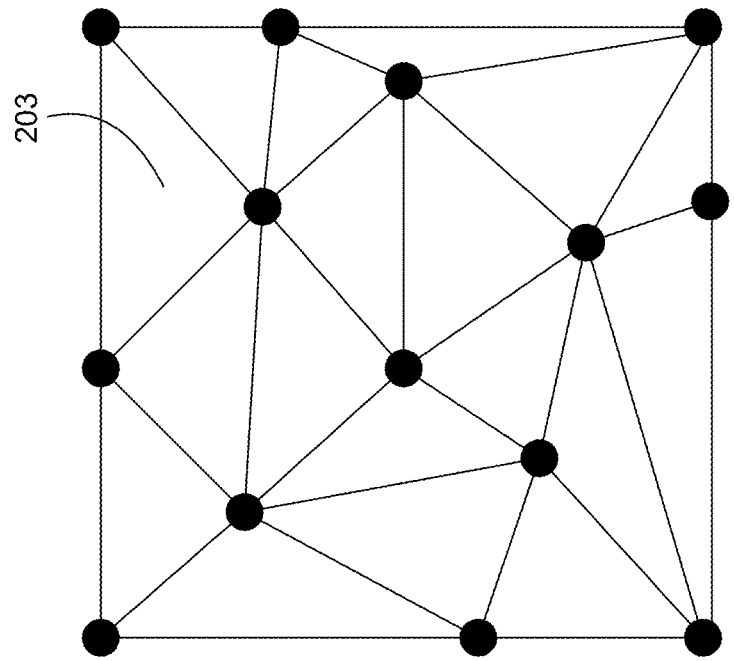
FIGS. 2A and 2B show different illustrative approaches that may be used to initialize a recursive adaptive scan by dividing the azimuth and elevation ranges into sample points that tesselate the scan zone into polygons.
Figure 2B:
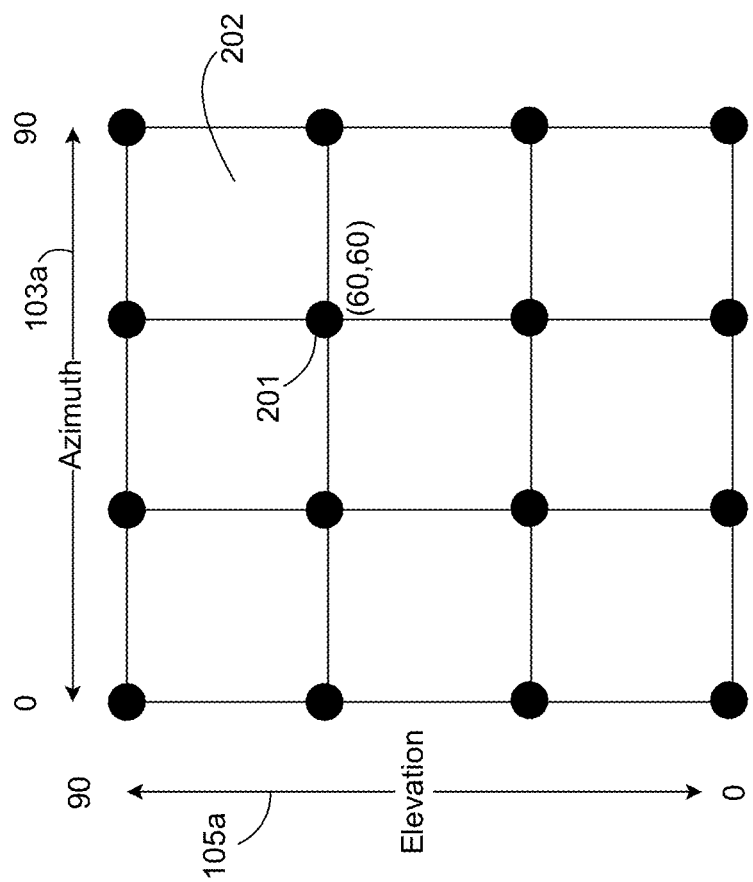

Recursive adaptive scan 115 may initially divide the desired scan range in azimuth and elevation into a grid of points. This grid is the initial set of points where signal strength in each of the selected frequency subranges is sampled. One or more embodiments may use any type and shape of grid, with any number of points, for the initial step of the recursive adaptive scan. A tradeoff may be made wherein using a finer grid (with more points) is more time consuming but reduces the chance of missing objects that are smaller than the grid spacing. FIGS. 2A and 2B show two illustrative grids for an illustrative scan of a range 103a of 90 degrees in azimuth and a range 105a of 90 degrees in elevation. (One or more embodiments may scan over a larger azimuth range; the 90-degree range for azimuth is shown here for ease of illustration.) The grid shown in FIG. 2A is a regular square grid with points every 30 degrees. (In many applications, the initial grid would likely use closer grid spacing for the initial grid; this spacing is shown for ease of illustration.) Illustrative grid point 201 is at 60 degrees azimuth and 60 degrees elevation.

Embodiments of the invention may use any type of initial grid, including but not limited to a square or rectangular grid such as the grid of FIG. 2A. In some applications, a grid type or grid spacing in certain subregions may be based for example on knowledge of the environment or of the type of objects that may be located in the environment. In some applications, a grid type or grid spacing may be based for example on characteristics of the pan-tilt system or other aiming system. Grid points may form irregular regions or may even be random or pseudorandom in one or more embodiments. FIG. 2B for example illustrates a grid with irregularly spaced grid points.

Recursive adaptive scan 115 commands the aiming system 102 to aim in each grid point direction, and to then obtain the signal intensity in each frequency subrange in that direction. Results may be recorded in data structure 116. This step provides the initial step for the recursive adaptive scan. In subsequent steps, certain subregions of the grid may be subsampled. The initial grid points may be used for example to define polygons, with the grid points at the vertices, that form a tessellation of the surface spanned by the azimuth range and the elevation range. For example, the grid in FIG. 2A generates a tessellation of the surface into squares such as square 202, and the grid in FIG. 2B generates a tessellation of the surface into triangles such as triangle 203. The change in signal strength across each polygon may be analyzed after the initial scan to determine which polygons, if any, should be subdivided.

In one or more embodiments of the invention, a grid region may be subdivided into smaller regions when the signal intensity measured at the grid region's vertices indicates that the signal intensity in one or more frequency subranges is changing significantly within the region. By focusing on changes in signal intensity, the recursive adaptive scan successively locates potential edges of objects. At object edges (or at edges of the parts of objects that are emitting radiation), signal intensity may change rapidly. Searching for rapid changes in signal strength is therefore an efficient method of locating objects of interest. This analysis may be performed separately for each frequency subregion.

Using the signal strength values measured for the grid points in each frequency subregion, one or more embodiments of the invention may for example calculate or estimate the gradient magnitude of the signal strength (for each frequency subrange) within each polygon of the tessellation generated by the grid points. Gradients may be estimated using any of the algorithms known in the art, such as convolution with a gradient kernel for example. In one or more embodiments a simple estimate of the gradient magnitude may be made for example by calculating the maximum absolute difference in signal strength between pairs of vertices in a polygon, divided by the distance between these vertices. FIGS. 3A and 3B illustrate this process for the grids of FIGS. 2A and 2B, respectively, for an illustrative frequency subrange. (This analysis may be performed separately for each frequency subrange, since gradients may be large in certain regions only for certain frequencies.) In this example, there are edges of an object in the upper right corner of the grid that emits (or otherwise affects) radiation in the analyzed frequency. Therefore, grid square 202 in FIG. 3A, and triangle 203 in FIG. 3B are regions with high gradient magnitudes for the signal strength in the selected frequency and are shaded as indicated in legend 300. The criteria for "high" gradient magnitude may vary depending on the embodiment and on the application; in one or more embodiments a simple threshold value, which may depend on frequency, may be applied and a gradient magnitude may be considered as high when it exceeds this (possibly frequency-specific) threshold.

Once high gradient magnitude regions (such as polygons formed by grid points) in a specific frequency subrange are identified, the recursive adaptive scan process may subdivide these regions by adding additional interior points within the regions. These new interior points may then be scanned (in the relevant frequency subrange), and this process may be repeated. For example, in square 202, interior points 301, 302, 303, and 304 may be added to subdivide square 202 into four sub-squares. In triangle 203, interior point 311 may be added to subdivide the triangle into three sub-triangles. Embodiments may subdivide high gradient regions in any desired manner. For example, square 202 may be subdivided into any number of sub-squares (or into polygons of any other shapes).

FIG. 4 continues the example of FIGS. 2A and 3A to show successive illustrative steps of recursive adaptive scanning for a regular square grid. High gradient regions are shaded as in legend 300. An object with a boundary 400 is located in the area, and the signal intensity in a selected frequency subranges changes significantly across this boundary. All of the steps shown apply to this specific frequency subrange emitted by or affected by the object. Grid 401 shows the initial grid, with square 202 as the only high gradient region. This square 202 is then subdivided into four sub-squares 411, 412, 413, and 414, and the scan of signal strength is performed for the new interior points added to the grid. Gradient magnitudes (in the selected frequency subrange) are then calculated for each sub-square 411, 412, 413, and 414; the gradient magnitude is high in 411, 412, and 413. These squares 411, 412, and 413 are then each subdivided in grid 403, and the high gradient regions in 403 are then subdivided again in grid 404. As this process continues, the edge 400 of the object comes into sharper focus. Subdivision may terminate based on various criteria that may vary across embodiments. For example, in one or more embodiments, subdivision may terminate when the gradient magnitudes are all below a specific value. In other embodiments, subdivision may continue for at most a specified number of steps, or until the resolution of the aiming system in either azimuth or elevation is reached.

FIG. 5 illustrates that subdividing only high gradient regions may generate tremendous efficiency improvements, thereby making it practical to scan a large area in a large number of frequency subranges. Grid 501 shows a full grid with uniform grid spacing at the size of the smallest sub-square in grid 404 of FIG. 4. This full "raster scan" grid has 576 sub-squares, compared to only 33 sub-squares in grid 404 generated by recursive adaptive scanning; recursive adaptive scanning therefore reduces scanning time and resources by a factor of approximately 20 in this example. The efficiency improvement of recursive adaptive scanning becomes even greater as the grid resolution becomes finer.

An issue that may be important in some applications or embodiments is that there may be natural or man-made sources of radiation in the scanned frequencies that are not of particular interest, and that mask the objects of interest. The "background noise" generated by these sources may be removed in one or more embodiments by performing preliminary scans to measure the background noise, and then subtracting this background noise from measured signal strengths when searching for objects of interest. This process is illustrated in FIG. 6, where background sources 601, 602, and 603 may generate noise that complicates detection of the objects of interest 131 and 133. Another potential complication is that certain background sources of radiation may radiate in patterns that change over the course of a day; for example, solar radiation 602 largely disappears at night, and certain man-made background sources like broadcast tower 601 may be active at different times day. Therefore, one or more embodiments may perform scans of background noise at different times of day (or at different times of the year or other time period to account for other temporal variations, such as seasonal). A recursive adaptive scan 611 (operating similarly to that described above, with progressive refinement of grids to focus on regions of rapidly changing background signal intensity in each frequency subrange) may be performed to measure the background noise efficiently, potentially at various times of day 612, and the results may be stored in a background noise data structure 613. This data structure 613 is similar to data structure 116 of FIG. 1, except that it stores background noise intensities 615 at different azimuths, elevations, and frequency ranges, and these values are combined with a time of day (or other time/date stamp) 614 that indicates when the data was captured.

To detect objects of interest, recursive adaptive scan 621 may then be performed at a desired time 622. This operates as described above with the key difference being that once a signal intensity 623 is measured at a particular azimuth, elevation, and frequency subrange, the background intensity at (or nearest) that azimuth, elevation, and frequency subrange, and at the time of day closest to the scan time 622, is subtracted from the measured intensity to obtain a signal intensity difference 624. The gradient of the difference 624 in each frequency subrange is then used to determine which regions to subdivide in each recursive scan at increasingly finer grid spacings.

While the invention herein disclosed has been described by means of specific embodiments and applications thereof, numerous modifications and variations could be made thereto by those skilled in the art without departing from the scope of the invention set forth in the claims.

What is claimed is:

1. A passive multispectral scanner that uses recursive adaptive sampling, comprising:
   one or more directional antennas configured to receive electromagnetic signals within a total frequency range;
   an aiming system coupled to said one or more directional antennas and configured to aim said one or more directional antennas to receive signals from sources emitting at an azimuth angle and an elevation angle relative to a base orientation of said one or more directional antennas, wherein:
      said azimuth angle lies within an azimuth range; and
      said elevation angle lies within an elevation range;
   a frequency selection system coupled to said one or more directional antennas and configured to: obtain a signal strength in a multiplicity of frequency subranges, wherein each frequency subrange of said multiplicity of frequency subranges lies within said total frequency range; and
   a controller comprising a processor and a memory, wherein:
      said controller is coupled to said aiming system and to said frequency selection system; and
      said controller is configured to:
         create or update a signal strength data structure in said memory that associates a signal strength with an azimuth, an elevation, and a frequency subrange;
         divide said azimuth range and said elevation range into a grid of points, wherein:
            each point comprises an azimuth within said azimuth range and an elevation within said elevation range; and
            said grid of points forms vertices of polygons that form a tessellation of a surface spanned by said azimuth range and said elevation range;
         for each point in said grid of points:
            transmit said azimuth and said elevation associated with each point to said aiming system;
            obtain said signal strength corresponding to each frequency subrange from said frequency selection system; and
            update said signal strength data structure with an entry comprising said azimuth, said elevation, said each frequency subrange, and said signal strength; and
         for each polygon of said polygons and for each frequency subrange of said multiplicity of frequency subranges:
            estimate a gradient magnitude of said signal strength in said each frequency subrange within said each polygon; and
            when said gradient magnitude exceeds a threshold:
               subdivide said each polygon into a subgrid comprising interior points within said each polygon, wherein each interior point of said interior points has an associated interior point azimuth and interior point elevation;
               for each interior point in said subgrid:
                  transmit said interior point azimuth and interior point elevation to said aiming system;
                  obtain said signal strength corresponding to said each frequency subrange; and
                  update said signal strength data structure with an entry comprising said interior point azimuth, said interior point elevation, said each frequency subrange, and said signal strength; and
               continue subdividing polygons of said subgrid until a gradient magnitude within said polygons is smaller than a minimum, or until a resolution limit of said aiming system is reached.

2. The passive multispectral scanner that uses recursive adaptive sampling of claim 1, wherein:
   said azimuth range comprises at least 180 degrees; and
   said elevation range comprises at least 45 degrees.

3. The passive multispectral scanner that uses recursive adaptive sampling of claim 2, wherein:
   said azimuth range comprises 360 degrees; and
   said elevation range comprises 180 degrees.

4. The passive multispectral scanner that uses recursive adaptive sampling of claim 1, wherein:
   said total frequency range comprises at least 50 kilohertz to 7 gigahertz.

5. The passive multispectral scanner that uses recursive adaptive sampling of claim 1, wherein:
   said multiplicity of frequency subranges comprises at least 5000 frequency subranges.

6. The passive multispectral scanner that uses recursive adaptive sampling of claim 5, wherein:
   said multiplicity of frequency subranges comprises at least 10000 frequency subranges.

7. The passive multispectral scanner that uses recursive adaptive sampling of claim 1, wherein:
   said resolution limit of said aiming system comprises less than or equal to one arc second in azimuth and less than or equal to one arc second in elevation.

8. The passive multispectral scanner that uses recursive adaptive sampling of claim 1, wherein said controller is further configured to:

create or update a background noise signal strength data structure in said memory that associates a background noise signal strength with an azimuth, an elevation, and a frequency subrange;

measure said background noise signal strength across said azimuth range, said elevation range, and said multiplicity of frequency subranges and update said background noise signal strength data structure with measured background noise signal strength;

for each point in said grid of points:
  after obtaining said signal strength corresponding to each frequency subrange from said frequency selection system, subtract said background noise signal strength associated with said azimuth, said elevation, and said each frequency subrange from said signal strength; and for each polygon of said polygons and for each frequency subrange of said multiplicity of frequency subranges:
  when said gradient magnitude exceeds a threshold:
    for each interior point in said subgrid:
      after obtaining said signal strength corresponding to each frequency subrange from said frequency selection system, subtract said background noise signal strength associated with said azimuth, said elevation, and said each frequency subrange from said signal strength.

9. The passive multispectral scanner that uses recursive adaptive sampling of claim 8, wherein:
said background noise signal strength data structure in said memory further associates said background noise signal strength with a time of day;
said controller is further configured to:
  measure said background noise signal strength across said azimuth range, said elevation range, said multiplicity of frequency subranges, and at multiple times of day, and update said background noise signal strength data structure with measured background noise signal strength;
  for each point in said grid of points:
    after obtaining said signal strength corresponding to each frequency subrange from said frequency selection system at a measurement time of day, subtract said background noise signal strength associated with said azimuth, said elevation, said each frequency subrange, and said measurement time of day from said signal strength; and
  for each polygon of said polygons and for each frequency subrange of said multiplicity of frequency subranges:
    when said gradient magnitude exceeds a threshold:
      for each interior point in said subgrid:
        after obtaining said signal strength corresponding to each frequency subrange from said frequency selection system at a measurement time of day, subtract said background noise signal strength associated with said azimuth, said elevation, said each frequency subrange, and said measurement time of day from said signal strength.

10. The passive multispectral scanner that uses recursive adaptive sampling of claim 9, wherein said multiple times per day comprise once per hour or more frequently.

11. The passive multispectral scanner that uses recursive adaptive sampling of claim 8, wherein measure said background noise signal strength across said azimuth range, said elevation range, and said multiplicity of frequency subranges comprises:
for each point in said grid of points:
  transmit said azimuth and said elevation associated with each point to said aiming system;
  obtain said background noise signal strength corresponding to each frequency subrange from said frequency selection system; and
  update said background noise signal strength data structure with an entry comprising said azimuth, said elevation, said each frequency subrange, and said background noise signal strength; and
for each polygon of said polygons and for each frequency subrange of said multiplicity of frequency subranges:
  estimate a gradient magnitude of said background noise signal strength in said each frequency subrange within said each polygon; and
  when said gradient magnitude exceeds a threshold:
    subdivide said each polygon into a subgrid comprising interior points within said each polygon, wherein each interior point of said interior points has an associated interior point azimuth and interior point elevation;
    for each interior point in said subgrid:
      transmit said interior point azimuth and interior point elevation to said aiming system;
      obtain said background noise signal strength corresponding to said each frequency subrange; and
      update said background noise signal strength data structure with an entry comprising said interior point azimuth, said interior point elevation, said each frequency subrange, and said background noise signal strength; and
    continue subdividing polygons of said subgrid until a gradient magnitude within said polygons is smaller than a minimum, or until a resolution limit of said aiming system is reached.

12. The passive multispectral scanner that uses recursive adaptive sampling of claim 1, further comprising:
a database comprising frequency emission signatures for a plurality of objects;
wherein said controller is further configured to:
  compare said signal strength data structure to said database to identify one or more objects of said plurality of objects that are present.

* * * * *